H. DOTZER AND S. G. BARNARD.
BUMPER.
APPLICATION FILED JAN. 5, 1920. RENEWED JUNE 28, 1921.
1,386,452.
Patented Aug. 2, 1921.
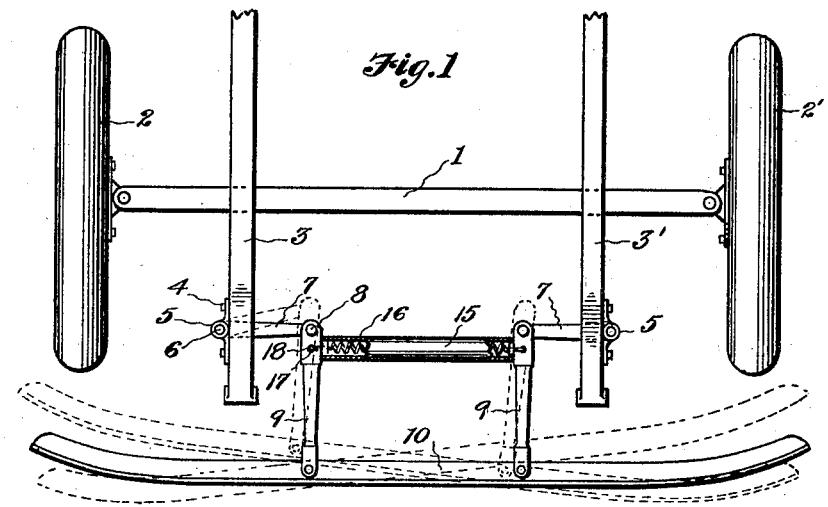
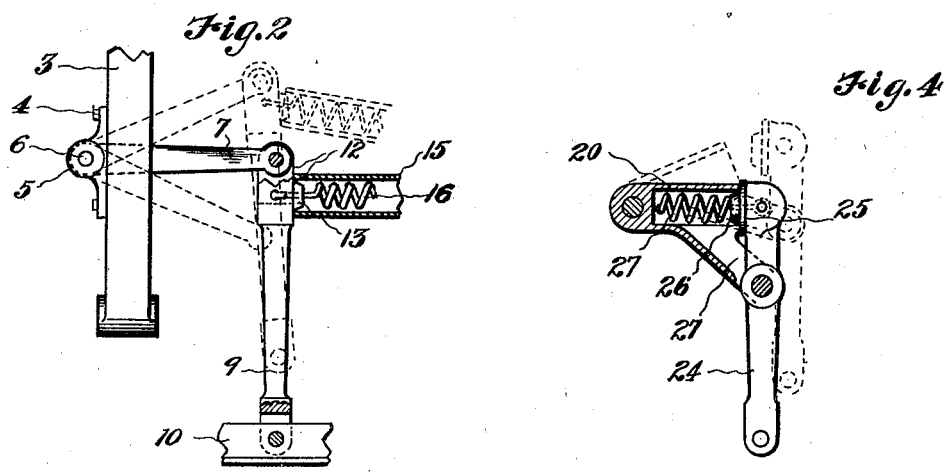
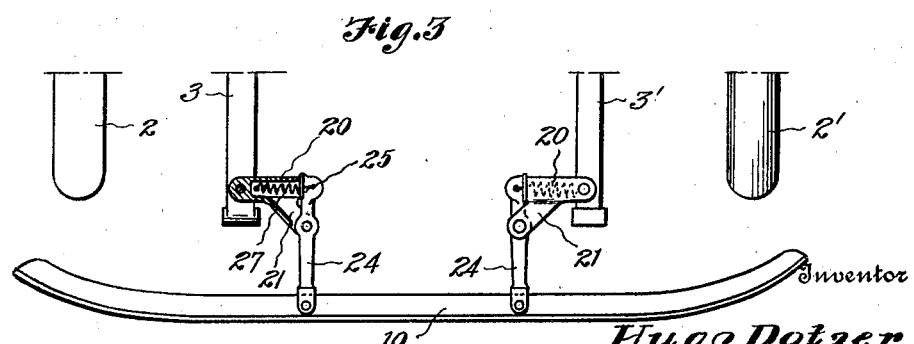

UNITED STATES PATENT OFFICE.

HUGO DOTZER AND SAMUEL G. BARNARD, OF SEATTLE, WASHINGTON.

BUMPER.

1,386,452. Specification of Letters Patent. Patented Aug. 2, 1921.

Application filed January 5, 1920, Serial No. 349,536. Renewed June 28, 1921. Serial No. 481,228.

*To all whom it may concern:*

Be it known that we, HUGO DOTZER and SAMUEL G. BARNARD, a citizen of Germany, and a citizen of the United States, respectively, and residents of the city of Seattle, county of King, and State of Washington, have invented certain new and useful Improvements in Bumpers, of which the following is a specification.

This invention relates to improvements in bumpers for automobiles, and more particularly to bumpers of that character which may be mounted at the front or rear of an automobile's chassis to serve as a protection to the vehicle from accidental collision.

The principal object of the invention is to provide a bumper of this character which will yieldingly resist an object coming in contact therewith, so that the shock, or jar, incidental to collision or contact, will be gradually resisted and damage to a great extent will be avoided, not only to the vehicle, but also to the bumper itself.

It is also an object of the invention to provide yieldable mounting members for the bumper bar which normally retain the bar in proper functional position but which will permit the bar, when engaged, to move laterally in either direction at its ends or in a longitudinal direction, and which will return the bar to normal position as soon as it is released from contact with an object.

In accomplishing these objects I have provided improved details of structure, the preferred forms of which are illustrated in the accompanying drawings, wherein:

Figure 1 is a plan view of the front portion of an automobile chassis, showing a bumper mounted thereon according to the present invention.

Fig. 2 is an enlarged view, partly in section, of the mounting members at one end of the bar.

Fig. 3 is a plan view, partly in section, of an alternative construction for supporting the bumper bar.

Fig. 4 is an enlarged plan view of the supporting members at one end of the bar, as shown in Fig. 3.

Referring more in detail to the drawings, 1 designates an axle, 2 and 2' ground wheels, and 3, 3', the ends of the side beams of the frame, or chassis, of an automobile of any of the usual types of construction. The beams 3, 3', as here shown, and in most automobiles, extend slightly forwardly of the vehicle wheels and serve to support that end of the vehicle body from springs which are mounted on the axle.

Secured to the outer sides of the beams 3 and 3', adjacent their ends, by means of bolts 4 or otherwise, are bearings 5, and extending downwardly therethrough are pins or bolts 6 whereon the outer ends of horizontally and inwardly extending arms 7 are pivotally fixed.

Pivotally mounted by means of bolts 8 extending through the inner ends of the arms 7 are paired, forwardly extending arms 9, which at their forward ends are pivotally fixed to and support a bumper bar 10 which normally extends parallel with the axle 1 and is preferably of such length that its ends are beyond the line of the vehicle wheels.

The arms 9 are provided adjacent their inner ends, and on adjacent faces, with parallel surfaces 12 whereon outwardly tapered conical bosses 13 are formed, and seated over these bosses and engaging the surfaces 12 are the opposite ends of a transverse tube 15.

Inclosed within the tube 15 is a coiled spring 16, provided at its ends with hooks 17 which are fixed to the arms 9 by being extended through apertures 18 therein; the tension of the spring 16 is sufficient to hold the arms 9 tightly against the ends of the tube 15 and to retain them normally in parallel and straight forward relation with respect to the vehicle frame.

In Figs. 3 and 4 is illustrated an alternative construction, wherein the arms 7 of the device just described, are replaced by inwardly extending tubular members 20 which are pivotally mounted at the forward ends of the beams 3 and 3', and which have forwardly and inwardly extending arms 21 formed integrally therewith.

Pivotally mounted by the extensions 21 are arms 24 which, at their outer ends, are pivotally fixed to the bumper bar 10 and at their inner ends are provided with caps 25 having tapered bosses 26 thereon which are adapted to seat within the open ends of the tubular members 20. Coiled springs 27 are located within these latter members and are fixed at their opposite ends to the bases of the tube members and to the cap ends of the arms 24 so as to normally hold the ends of the arms tightly against the ends of the tubes and consequently, as in the previous device, hold the arms 24 directly forward and the bar 10 parallel with the front of the vehicle.

With the different parts of the device so constructed and assembled as described, it will be seen that should either end of the bumper bar 10 engage an object, that end of the bar will yield inwardly or longitudinally, to gradually absorb the shock of collision, and in most cases will prevent damage to both the bar and vehicle, and to the object engaged.

It is apparent that such a bumper could be mounted at either end of the vehicle and would effectively protect the same from damage by accidental collision with other vehicle or objects by permitting the shock or jar of collision to be gradually and yieldingly resisted instead of being entirely and suddenly resisted, as is the case in the rigidly mounted bumper bars.

What we claim as new is:

1. The combination with a vehicle frame of a bumper comprising a pair of arms pivotally mounted on the said frame, a second set of arms pivotally connected to the first arms, a bumper bar pivotally mounted at the outer ends of the second arms and yieldable means for retaining the arms against movement on their mountings when the bumper bar is engaged.

2. The combination with a vehicle frame of a bumper comprising a pair of arms pivotally mounted at opposite points of the frame with their free ends adapted to swing longitudinally thereof, a second set of arms pivotally mounted at the free end of the first arms and adapted to swing transversely of the frame, a bumper bar mounted at the ends of the latter arms and a yieldable member for normally retaining the arms to hold the bar in functional position.

3. The combination with a vehicle frame of a bumper comprising a pair of arms pivotally mounted at opposite points of the frame and directed toward each other, a second set of arms pivotally mounted on the free ends of the first arms and directed forwardly therefrom, a bumper bar supported by pivotal connections from the outer ends of the latter arms and means connected with said mounting arms to yieldingly resist movement of the bar when it is engaged.

4. The combination with a vehicle frame, of a bumper comprising a pair of inwardly directed arms pivotally mounted at opposite points of the frame, a second set of arms pivotally mounted at the free ends of the first arms and extending forwardly therefrom in parallel relation, a bumper bar mounted by pivotal connections at the outer ends of the latter arms and extending transversely across the end of the frame, a tension spring secured at its opposite ends to the forwardly directed arms and a rigid transverse member having its opposite ends engaging the inner surfaces of the said arms on opposite sides of the spring connections therewith, for the purpose set forth.

5. The combination with a vehicle frame of a bumper, comprising a pair of arms pivotally mounted on the vehicle frame and extending toward each other, a second set of arms pivotally mounted on the first arms and extending forwardly therefrom, said latter arms having inwardly extending bosses on their inner faces, a bumper bar mounted at the outer ends of the second set of arms through pivotal connections therewith, a tube having its opposite ends seated against said bar supporting arms about said bosses and a spring inclosed within said tube and secured at its opposite ends to said bars for the purpose set forth.

Signed at Seattle, Washington, this 26th day of December, 1919.

HUGO DOTZER.
SAMUEL G. BARNARD.